(12) United States Patent
Anderson-Sprecher et al.

(10) Patent No.: US 12,741,855 B2
(45) Date of Patent: Sep. 22, 2026

(54) SYSTEMS AND METHODS FOR CONTROLLING AUTONOMOUS VEHICLE OPERATION BASED ON MONITORING OF A LOADING DOCK

(71) Applicant: SYMBOTIC LLC, Wilmington, MA (US)

(72) Inventors: Peter Anderson-Sprecher, Austin, TX (US); Krupal Patel, Austin, TX (US); Andrew Kooiman, Austin, TX (US)

(73) Assignee: Symbotic LLC, Wilmington, MA (US)

(*) Notice: Subject to any disclaimer, the term of this patent is extended or adjusted under 35 U.S.C. 154(b) by 23 days.

(21) Appl. No.: 19/054,742

(22) Filed: Feb. 14, 2025

(65) Prior Publication Data

US 2025/0263277 A1 Aug. 21, 2025

Related U.S. Application Data

(60) Provisional application No. 63/553,712, filed on Feb. 15, 2024.

(51) Int. Cl.

*B66F 9/06* (2006.01)
*B65G 69/28* (2006.01)
*B66F 9/075* (2006.01)

(52) U.S. Cl.

CPC .......... *B66F 9/063* (2013.01); *B65G 69/2882* (2013.01); *B66F 9/07581* (2013.01)

(58) Field of Classification Search

None

See application file for complete search history.

(56) References Cited

U.S. PATENT DOCUMENTS

2013/0261958 A1* 10/2013 Herron .................. G08G 1/143 705/13
2016/0116587 A1* 4/2016 Miller .................... B66F 9/065 701/1
2019/0080537 A1* 3/2019 Pryor ...................... B60R 25/10
2021/0138969 A1* 5/2021 Pfaff .................. B60R 11/0229
2024/0343508 A1* 10/2024 Fosgard .................. G08G 1/22
2025/0263277 A1* 8/2025 Anderson-Sprecher .................... B66F 9/063

* cited by examiner

*Primary Examiner* — Shelley Chen
(74) *Attorney, Agent, or Firm* — Perman & Green, LLP

(57) ABSTRACT

The present invention relates, in general, to systems and methods for controlling autonomous forklifts, and specifically, controlling autonomous forklifts based on monitoring of a loading dock. The present invention utilizes monitoring of a loading dock for human personnel and obstacles in order to safely maneuver an autonomous forklift during loading and unloading operations into and out of a trailer.

16 Claims, 5 Drawing Sheets

SYSTEMS AND METHODS FOR CONTROLLING AUTONOMOUS VEHICLE OPERATION BASED ON MONITORING OF A LOADING DOCK

BACKGROUND

Field of the Invention

The present invention relates, in general, to computer implemented systems and methods for monitoring a loading dock and controlling autonomous vehicle operation to prevent potential safety hazards.

Description of Related Art

Loading dock facilities, such as in warehouses, typically include multiple loading dock stations that facilitate the movement of goods between the warehouse and a vehicle, such as a semi-truck trailer, parked at the loading dock. Goods being delivered by, or loaded onto, trailers typically are stored on pallets, which are flat transport structures configured to hold goods for easier transportation by vehicles and other equipment, such as forklifts, operating in the warehouse.

Traditionally, human personnel have operated forklifts. However, with advances in autonomous vehicle technology, autonomous forklifts are increasingly being used in warehouse environments to lift and transport pallets to and from trailers parked at loading docks. While such technological advancement allows for increased operational efficiency within warehouses, the use of autonomous vehicles raises issues around warehouse safety, particularly for human personnel working on loading docks and/or inside trailers. Safety issues are especially pronounced when autonomous vehicles enter a trailer during loading operations, as the interior of trailers have limited opportunities for egress, and the autonomous vehicle sensors and perception systems may be obscured by a load being carried.

Thus, there is a need for systems and methods that provides safety for human personnel working in environments where autonomous vehicles are operating in, namely, to prevent egress into a trailer within which an autonomous vehicle is performing loading and/or unloading operations.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
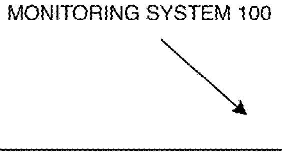
FIG. 1 is a block diagram of a monitoring system for a loading dock.
Figure 1:
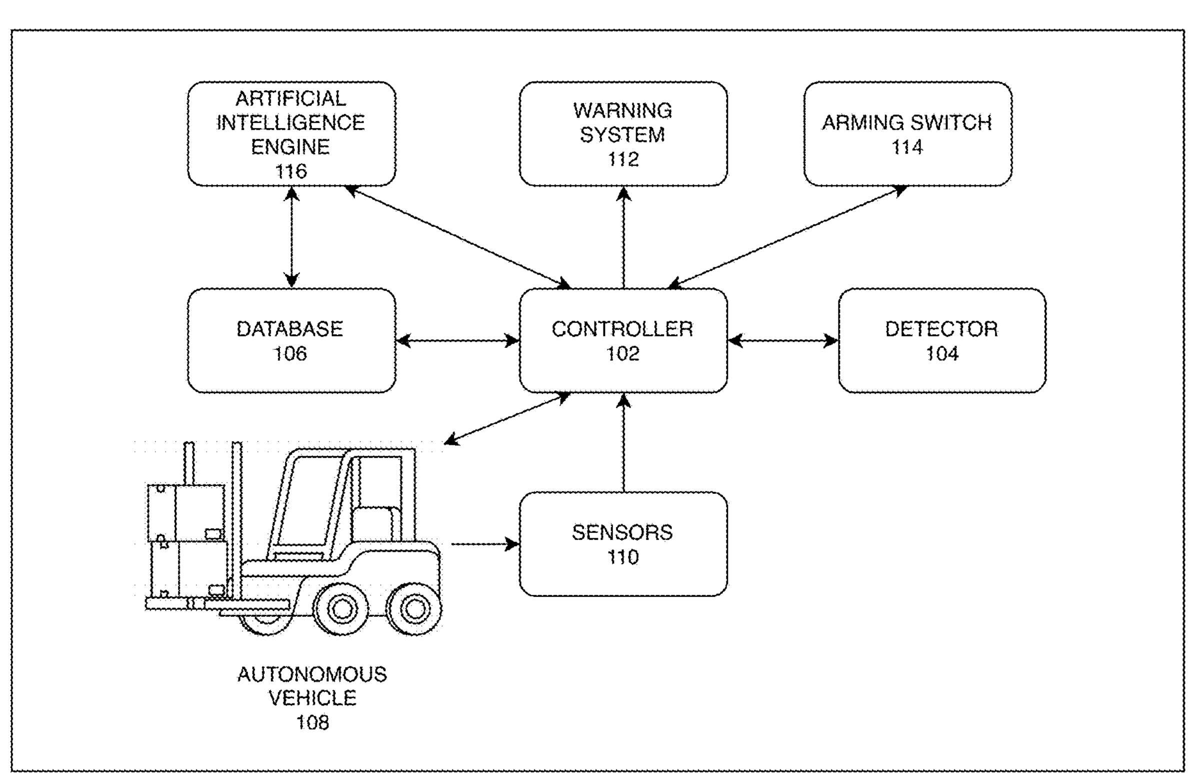

The following definitions are meant to aid in the description and understanding of the defined terms in the context of the present invention. The definitions are not meant to limit these terms to less than is described throughout this specification. Such definitions are meant to encompass grammatical equivalents.

As used herein, the term “autonomous vehicle” can refer to, for example, autonomous mobile robots, automatic guided vehicles, vision guided vehicles, semi-autonomous vehicles, and remote-piloted autonomous vehicles, as examples, which serve as equipment, pallet, object, and cargo moving and transport vehicles, including, but not limited to, forklifts, pallet loaders, side loaders, lift trucks, fork hoists, stacker-trucks, trailer loaders, industrial trucks, pallet jacks, pallet stackers, tow tractors, tugs, and the like.

As used herein, the terms “sensor” and “detector” can refer to, for example, sensing technologies that utilize LiDAR, radar, infrared sensors, sonar, ultrasonic sensors, optical sensors, such as photoelectric sensors, fiber optic sensors, photoconductive devices, reflective sensors, phototransistors, ambient light sensors, infrared sensors, photodiodes, and optical switches, point sensors, proximity sensors, through beam sensors, light curtains, image and video capturing devices, machine vision systems, any combination thereof, and the like.

As used herein, the term “network” can refer to, for example, the Internet, a wide area network (WAN), metropolitan area network (MAN), campus area network (CAN), local area network (LAN), but the network could at least theoretically be of an applicable size or characterized in some other fashion (i.e., personal area network (PAN), home area network (HAN), and the like), a wireless network, a wireless mesh network, a cellular network, a landline network, and/or a short-range connection network (i.e., such as Bluetooth, Zigbee, infrared, and the like). The term “network” can further refer to enterprise private networks, edge networks, and/or virtual private networks.

As used herein, the term “processor” can refer to, for example, any programmable system including systems using micro-controllers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term “processor.”

As used herein, the terms “software” and “firmware” are interchangeable, and can refer to, for example, any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term “database” can refer to, for example, a persistent data store with indexing capabilities to expedite query processing. The database can implement various database management systems types such as relational, object-oriented, hierarchical, document-oriented, flat file, object-relational, and any other structured collection of records. The database can be stored locally, remotely, on a cloud environment, and/or on a distributed ledger.

As used herein, the term “computing device” can refer to, for example, mobile phones, portable media players, desktop computers, laptop computers, netbooks, smartphones, tablet computers, wearable devices, “smart” watches, “smart” bracelets, “smart” necklaces, enhanced vision devices and systems, augmented vision headsets/glasses, internet-connected streaming media devices, any combination thereof, and the like.

As used herein, the term "inertial measurement unit" can refer to, for example, accelerometers, gyroscopes, magnetometers, pressure sensors, any combination thereof, and the like.

As used herein, the term "artificial intelligence" can refer to, for example, machine learning, deep-learning, supervised learning, unsupervised learning, semi-supervised learning, generative artificial intelligence, reinforced learning, fuzzy logic, neural networks, historical data and pattern analysis, any combination thereof, and the like.

As used herein, the term "engine" can refer to, for example, hardware components, software components, such as source code, packages, libraries, algorithms, and the like, as well as combinations therein.

As used herein, the term "positioning beacon" can refer to, for example, ultra-wideband (UWB) technology, Bluetooth Low Energy (BLE) technology, proximity detectors, acoustic technology, infrared systems, Wi-Fi positioning systems, any combination thereof, and the like.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an autonomous forklift operating in a loading dock environment, it is understood that the system could be implemented in any autonomous or semi-autonomous vehicle system operating in any environment where safety measures are required to protect humans, vehicles, objects, access points, and egress/ingress locations.

FIG. 1 is a block diagram of a monitoring system 100 for a loading dock. In an embodiment, the monitoring system 100 includes a controller 102 communicatively coupled via at least one network to a detector 104, database 106, sensors 110 on-board an autonomous vehicle 108, a warning system 112, an arming switch 114, and an artificial intelligence engine 116. The network may be any type of network suitable to allow interaction between the components of the monitoring system 100. For example, the network may be a wired network, a wireless network, or any combination thereof. In a preferred embodiment, the network is a wireless network.

In an embodiment, the controller 100 consists of computing hardware, such as a processor, and software which is executed by the processor. In an embodiment, the controller 100 can include a server coupled to the network. In another embodiment, the controller 100 is cloud-based, and located on remote server, such as on a server provided by Google® Cloud Platform or the like. In yet another embodiment, the controller 100 can be distributed across multiple servers.

In an embodiment, the controller 102 receives input, such as data, from the detector 104, the database 106, the autonomous vehicle 108, the sensors 110, the arming switch 114, and the artificial intelligence engine 116, and provides output, such as commands, to the detector 104, the database 106, the autonomous vehicle 108, and the warning system 112.

In an embodiment, the detector 104 is placed adjacent to a dock plate so that it can detect the presence of the autonomous vehicle 108, humans, animals, and other objects, both inanimate and living, and both stationary and mobile. The detector 104 can consist of a single hardware component, or multiple hardware components, such as opposing optical devices. In a preferred embodiment, the detector 104 is an industrial light curtain, which can consist of a photoelectric transmitter that projects an array of synchronized, parallel infrared light beams to a receiver unit, thereby creating a sensing field. When an opaque object, such as the autonomous vehicle 108 or human, for example, interrupts one or more beams in the sensing field, circuitry in the detector 104 transmits a signal to the controller 108.

The use of an industrial light curtain for the detector 104 is exemplary, and is not intended to be a limiting. In other embodiments, the detector 104 can include LiDAR or other sensing or detecting devices as described herein.

In an embodiment, the database 106 is configured to store various data, receive queries from the controller 102, and return data to the controller 102 in response to the queries. The database 106 can store data collected by the detector 104 related to arming, disarming, interruptions to the signal field (i.e., when an autonomous vehicle or human traverses the signal field), faults, warning system activations, and the like.

Furthermore, the database 106 can store data collected by the sensors 110 on the autonomous vehicle 108, such as data related to motion, navigation, speed, and trajectory of the autonomous vehicle 108, as well as detected obstacles, collision avoidance maneuvers undertaken, and work performed such as loading and unloading operations, the number of pallets transported, individual pallet weights, and the like.

In an embodiment, the data in the database 106 is stored with an identifier related to at least one of the loading dock, the autonomous vehicle 108, the trailer, and/or any combination thereof. In addition, the data in the database 106 can be stored with timestamps.

In an embodiment, the autonomous vehicle 108 is an automated forklift that performs various pallet loading and unloading operations. The autonomous vehicle 108 is described in more detail in commonly owned application Ser. No. 18/480,214 entitled "Method and system for operating automated forklift", filed on Oct. 3, 2023, and commonly owned application Ser. No. 18/410,774 entitled "Method and system for deep learning based perception", filed on Jan. 11, 2024, both of which are incorporated by reference herein. The autonomous vehicle 108 includes a vehicle controller, battery, and communication module, allowing the autonomous vehicle to send data to, and receive commands and data from, the controller 102.

The autonomous vehicle 108 further includes various sensors 110, such as, but not limited to, cameras, LiDAR, inertial measurement units, odometers, a global positioning system (GPS), and the like. The sensors 110 area used to collect, for example, information related to the autonomous vehicle's surroundings, potential obstacles, depth perception, speed, velocity, orientation, angular rates, gravitational forces, wheel rotation, location, and navigation, and the like.

This data may be stored locally within a database on the autonomous vehicle 108, and/or can be transmitted to the controller 102, which can process the data and further transmit the data to the database 106 for storage and subsequent retrieval.

In an embodiment, the warning system 112 is configured to alert humans, such as personnel, workers, operators, and the like, in the vicinity of the loading dock and/or inside the trailer of a potential safety hazard. For example, if the autonomous vehicle 108 enters the sensing field, and another autonomous vehicle or human is concurrently within the trailer, the controller 102 transmits an activation command to the warning system 112, causing the warning system 112 to emit an alert.

In an embodiment, the warning system 112 can consist of a warning device having a visual display, illumination means, speaker, and/or a combination thereof. The warning system 112 can emit a strobe or flash, emit a siren or audible warning, and/or display a text or visual warning. In an embodiment, the warning system 112 can consist of multiple warning devices located throughout the loading dock and/or the surrounding environment where all of the devices can be activated simultaneously, or alternatively, the controller 102 can selectively activate one or more warning devices based on, for example, the severity of the potential safety hazard, the location of the potential safety hazard, and the like.

In another embodiment, the warning system 112 can be communicatively coupled to computing devices used by human personnel in the vicinity of the loading dock and/or inside the trailer. Upon receiving an activation command, the warning system 112 can transmit an alert to these computing devices. For example, the alert can be in the form of a text message, multimedia message, e-mail, social media message, telephone call, and the like.

In yet another embodiment, the warning system 112 can transmit an alert to a software application located on the computing devices, such as a smartphone application, where the software application activates a strobe of the computing device camera/lights, emits an audible warning or siren through the computing device speaker, displays a notification, text, or visual warning on the computing device's display, and/or causes the computing device to vibrate and provide haptic feedback.

In an embodiment, the arming switch 114 transmits a signal to the controller 102 to activate the detector 104. In another embodiment, the arming switch can be communicatively coupled to the detector 104, and can transmit an arming command directly to the detector 104. The arming switch 114 can be actuated manually through various mechanisms, including, for example, a physical switch or button, actuating a virtual switch through a software application on a computing device, and the like. In an embodiment, human personnel can actuate the arming switch 114 to arm the detector 104 upon manually verifying that no other autonomous vehicles or humans are present within the trailer.

In another embodiment, the detector 104 can be armed by the controller 102 upon receiving data from other sensors such as motion sensors, cameras, and the like, located within the trailer, or located on the loading dock and positioned to capture data of the entry and the interior of the trailer. For example, upon sensing no motion or movement within the trailer for a predetermined period of time, the controller 102 can transmit an arming command to the detector 104.

In yet another embodiment, the detector 104 is armed using a multi-stage approach, where the controller 102 automatically pre-arms the detector 104 as described herein, however, human personnel is required to complete the arming process by actuating the arming switch 114 after manually verifying that no other autonomous vehicles or humans are present within the trailer.

In an embodiment, the artificial intelligence engine 116 is communicatively coupled to the controller 102 and/or the database 106. The artificial intelligence engine 116 can analyze data collected over time by the detector 104 and sensors 110. This analysis by the artificial intelligence engine 116 allows the controller 102 to process the future data more efficiently, quickly generate commands, and improve the efficacy and accuracy of the monitoring system 100.

For example, the controller 106 can use analysis from the artificial intelligence engine 116 to determine when to automatically transmit an arming command to the detector 104.

Figure 2:
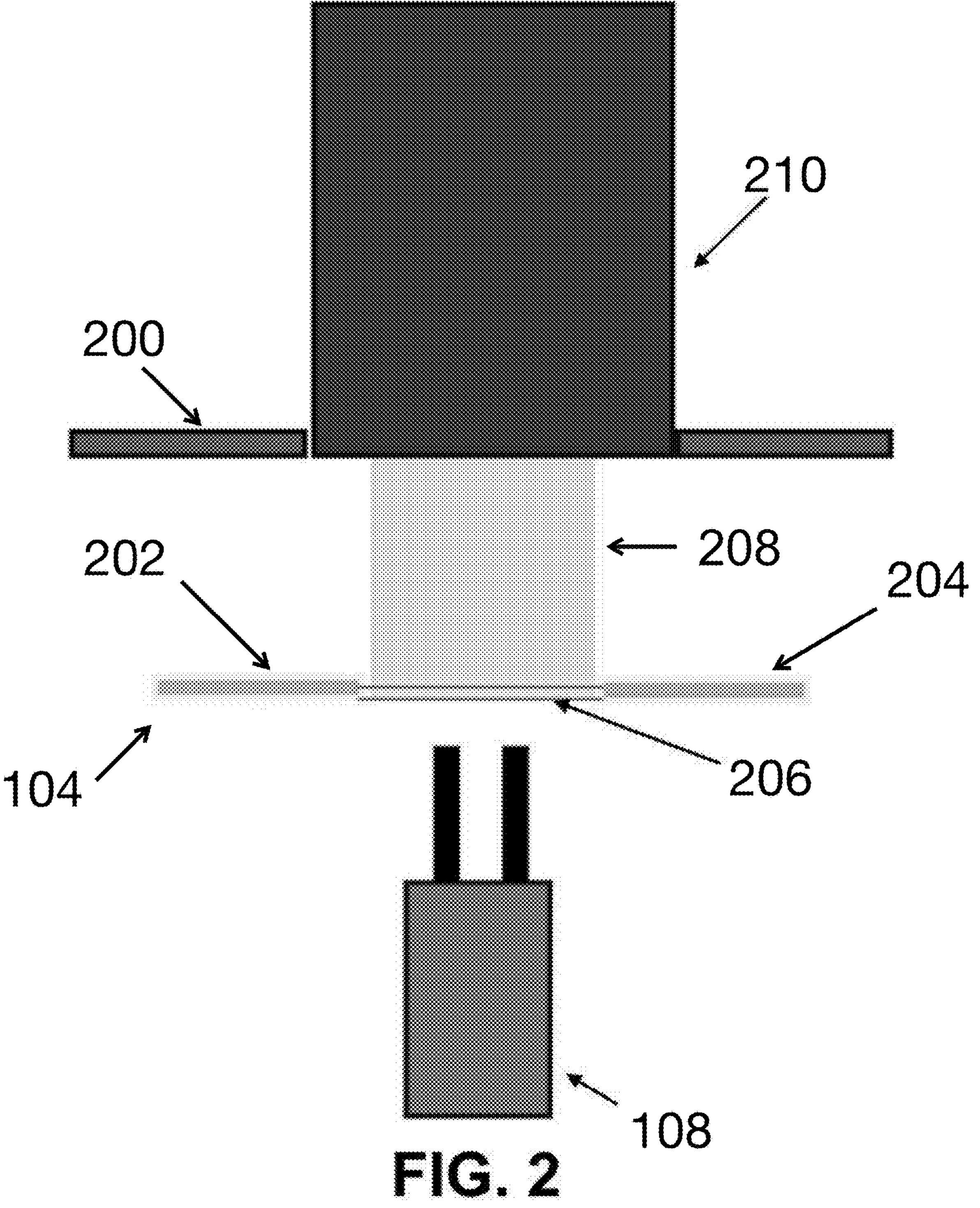
FIG. 2 is top-down diagram of the monitoring system for the loading dock when an autonomous vehicle has not yet traversed through a sensing field.

FIG. 2 is top-down diagram of the monitoring system 100 for the loading dock 200 when an autonomous vehicle 108 has not yet traversed through a sensing field 206. In an embodiment, the detector 104 is an industrial light curtain having a transmitter 202 and receiver 204, as described herein. The light beams emitted between the transmitter 202 and receiver 204 create the sensing field 206. Prior to the autonomous vehicle 108 traversing through the sensing field 206 and into a safe zone 208 which leads towards the trailer 210, the detector 104 is armed as described herein. The safe zone 208 is a region which the controller 102 has deemed to be clear of humans and other autonomous vehicles.

Figure 3:
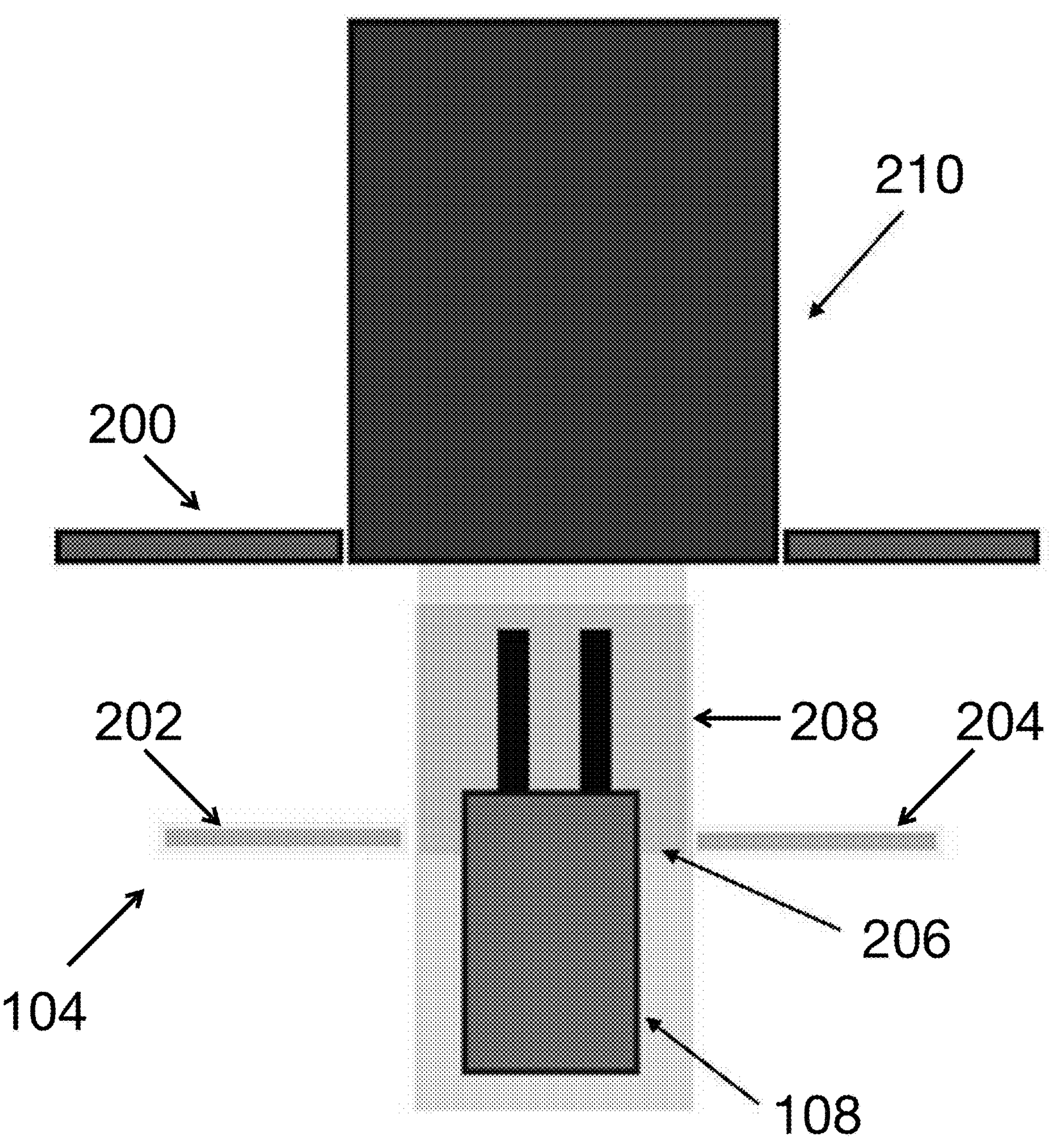
FIG. 3 is a top-down diagram of the monitoring system for the loading dock when the autonomous vehicle is traversing through the sensing field.

FIG. 3 is a top-down diagram of the monitoring system 100 for the loading dock 200 when the autonomous vehicle 108 is traversing through the sensing field 206. Once the autonomous vehicle 108 starts traversing through the sensing field 206, the detector 104 is disarmed by the controller 102, and data from the sensors 110 on the autonomous vehicle 108 are used by the controller 102 to detect if any obstacles, such as humans or other autonomous vehicles are present in the safe zone 208 and/or within the trailer 210. During traversal, if the sensors 110 detect a fault (i.e., detect a human or another autonomous vehicle in the safe zone 208), the autonomous vehicle 108 will cease operation and movement.

Figure 4:
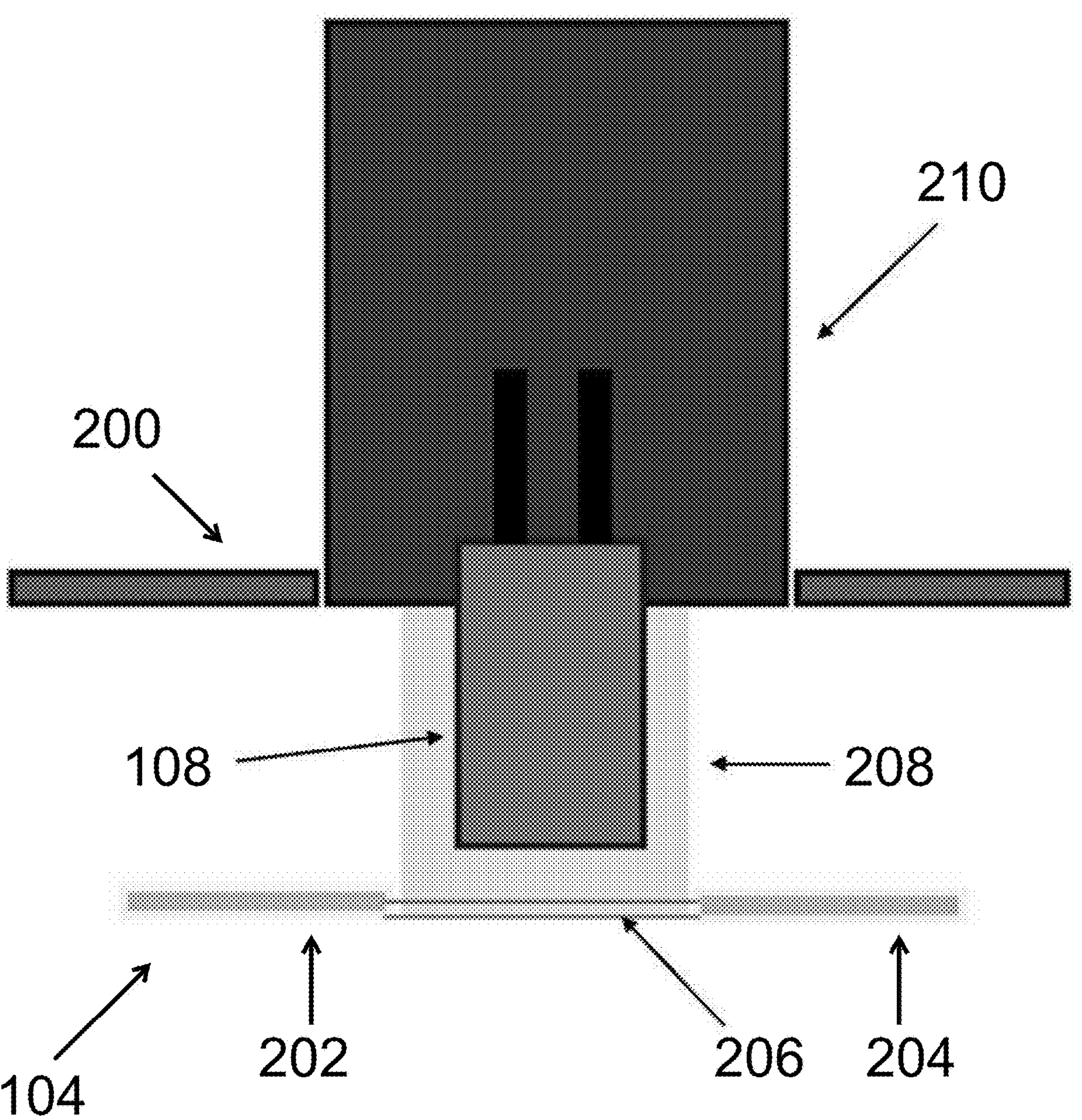
FIG. 4 is a top-down diagram of the monitoring system for the loading dock when the autonomous vehicle has fully traversed through the sensing field.

FIG. 4 is a top-down diagram of the monitoring system 100 for the loading dock 200 when the autonomous vehicle 108 has fully traversed through the sensing field 206. Once the autonomous vehicle 108 has completely passed through and traversed the sensing field 206, the detector 104 is armed by the controller 102, and the controller 102 uses data from the detector 104 to determine if any obstacles, such as humans or other autonomous vehicles are present in the safe zone 208 and/or within the trailer 210. In an embodiment, the sensors 110 on the autonomous vehicle 108 are deactivated and do not collect data. In another embodiment, the sensors 110 continue to collect data, however, this data is not utilized by the controller 102 to determine if a potential safety hazard exists.

In yet another embodiment, once the autonomous vehicle 108 has fully traversed through the sensing field 206, data from both the detector 104 and the sensors 110 are utilized by the controller 102 to determine if a potential safety hazard exists.

Figure 5:
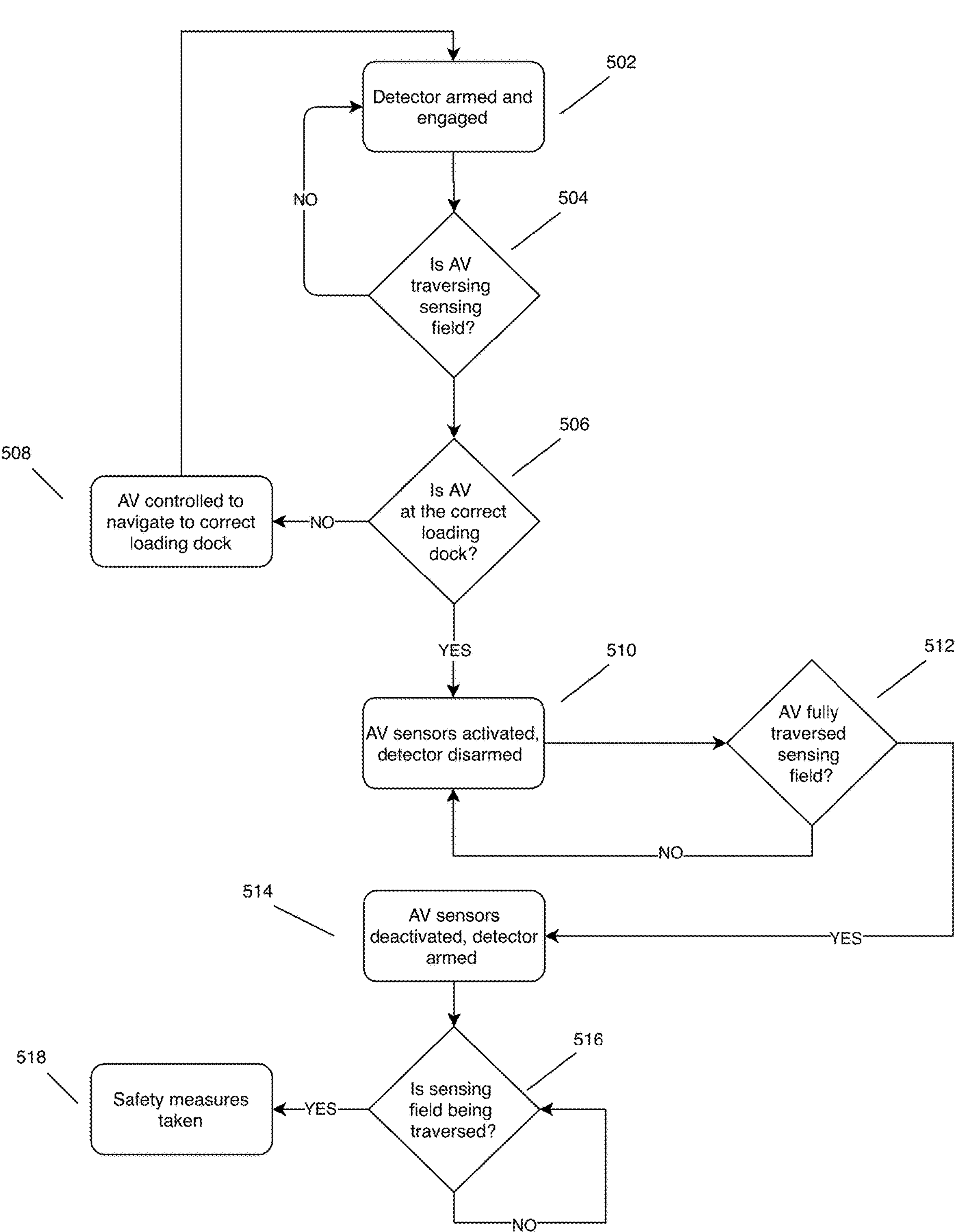
FIG. 5 is a flowchart illustrating the steps of operation of the monitoring system.

FIG. 5 is a flowchart illustrating the steps of operation of the monitoring system 100. At step 502, the detector 104 is armed and engaged by human personnel actuating the arming switch 104, and/or by the controller 102 transmitting an arming command to the detector 104, as described herein.

At step 504, the controller 102 determines if the autonomous vehicle 108 is traversing the sensing field 206. In an embodiment, the controller 102 continuously receives signals from the detector 104 once the detector 104 has been armed. In another embodiment, the controller 102 receives a signal from the detector 104 at predetermined intervals, such as, for example, every 1 second, 5 seconds, 10 seconds, and so on.

In an embodiment, the predetermined interval can be set by the controller 102 based on historical fault data analyzed by the artificial intelligence engine 116. Such historical fault data can be related to prior operation and/or events associated with the autonomous vehicle 108, the loading dock 200, the trailer 208, the arming switch 114, and/or the warning system 112. For example, if a particular loading dock has historically been prone to a high number of faults (i.e., potential safety hazards), then the controller 102 can increase the frequency at which it receives signals from the detector 104.

In yet another embodiment, the predetermined interval can be set by human personnel.

In an embodiment, the detector 104 pushes signals to the controller 102 as soon as the data is collected by the detector 104 in real-time. In another embodiment, the controller 102 pulls or polls data from the detector 104.

If the controller 102 determines that the autonomous vehicle 108 is not traversing through the sensing field 206, then the process returns to step 502 where the controller 102 continues to receive data from the detector 104.

If, however, the controller 102 determines that the autonomous vehicle 108 is traversing through the sensing field 206, then the process continues to step 506, where the controller 102 determines if the autonomous vehicle 108 is at the correct loading dock.

In an embodiment, to determine if the autonomous vehicle 108 is at the correct loading dock, the controller 102 first issues a command to mute the detector 104, and subsequently issues a command to un-mute the detector 104. While in a muted state, the controller 102 does not process data from the detector 104 for the purposes of determining if there is a potential safety hazard. However, while in the muted state, the sensing field 206 remains active.

If the autonomous vehicle 108 traverses the sensing field 206 within a window of time after the controller issues the command to mute the detector 104, and completes traversing the sensing field 206 field within another window of time after the controller 102 issues the command to un-mute the detector 104, then the autonomous vehicle 108 is deemed to be at the correct loading dock.

In addition, the monitoring system 100 can further utilize positioning beacons, such as, for example, UWB positioning beacons, in conjunction with the timed window functions described herein, to determine if the autonomous vehicle 108 is at the correct loading dock.

In another embodiment, the database 106 includes a mapping of the autonomous vehicle 108, loading docks which the autonomous vehicle 108 is scheduled to operate at, trailers which the autonomous vehicle 108 is scheduled to operate within, and corresponding scheduled time slots therein. Table 1 below depicts an exemplary database record, where each autonomous vehicle has a unique identifier (i.e., AV1, AV2, etc.), each detector has a unique identifier (i.e., D1, D2, etc.), each loading dock has a unique identifier (i.e., DOCK1, DOCK2, etc.), each trailer has a unique identifier (i.e., T1, T2, etc.), and for each mapping, there is an operation code (i.e., LOAD, UNLOAD, SORT, etc.). In another embodiment, each autonomous vehicle is mapped in the database 106 to only a particular loading dock or trailer for a particular scheduled operation time slot.

TABLE 1

| Autonomous Vehicle ID | Detector ID | Loading Dock ID | Trailer ID | Scheduled Operation Time Slot | Operation |
|---|---|---|---|---|---|
| AV1 | D1 | DOCK1 | T1 | 0900-1000 | LOAD |
| AV1 | D2 | DOCK2 | T2 | 1400-1430 | UNLOAD |

TABLE 1-continued

| Autonomous Vehicle ID | Detector ID | Loading Dock ID | Trailer ID | Scheduled Operation Time Slot | Operation |
|---|---|---|---|---|---|
| AV2 | D1 | DOCK1 | T3 | 1100-1300 | UNLOAD |
| AV2 | D3 | DOCK3 | T4 | 2200-0300 | LOAD |

The controller 102 can query the database 106 to determine if an autonomous vehicle is scheduled to be at a particular loading dock at a current time. If the controller 102 determines that the autonomous vehicle 108 is not at the correct loading dock, then the controller 102 instructs the autonomous vehicle 108 to navigate to the correct loading dock at step 508.

In another embodiment, the autonomous vehicle 106 can query the database 108 and/or the controller 102, to determine if the autonomous vehicle 108 is scheduled to be at a particular loading dock.

If, however, the controller 102 determines that the autonomous vehicle is at the correct loading dock, the process continues to step 510 where the controller 102 transmits a disarming command to the detector 104, and transmits a command to the autonomous vehicle 108 to activate the sensors 110. The controller 102 subsequently receives data from the sensors 110, and uses this data to determine if humans or other autonomous vehicles are present in the safe zone 208 and/or within the trailer 210.

In another embodiment, the autonomous vehicle 108 can locally process the data from the sensors 110 and determine if humans or other autonomous vehicles are present in the safe zone 208 and/or within the trailer 210. This determination can be transmitted to the controller 102 by the autonomous vehicle 108.

If the detector 104 is disarmed when the autonomous vehicle 108 arrives at the loading dock 200, the autonomous vehicle 108 will not proceed to attempt to enter the loading dock 200. That is, the autonomous vehicle 108 will only proceed with step 510 and transmit a disarming command to the detector 104 if the detector is in an armed state.

In yet another embodiment, the controller 102, detector 104 and/or the autonomous vehicle 108 can be communicatively coupled to an edge server located in closer proximity to the detector 104 than the controller 102. The edge server 102 can receive data from the sensors 110 and/or the detector 104 and can process this data to determine if humans or other autonomous vehicles are present in the safe zone 208 and/or within the trailer 210. This determination can be transmitted to the controller 102 by the edge server, or alternatively, the edge server can issue appropriate commands to the autonomous vehicle 108, the detector 104, the warning system 112, and/or the arming switch 114.

At step 512, the controller 102 determines if the autonomous vehicle 108 has fully traversed the sensing field 206. If the autonomous vehicle 108 has not fully traversed the sensing field 206, then the process reverts to step 510 where the sensors 110 of the autonomous vehicle 108 remain activated, the detector 104 remains disarmed, and the controller 102 continues to utilize the data from the sensors 110.

If, however, the autonomous vehicle 108 has fully traversed the sensing field 206, then the process continues to step 514 where the controller 102 arms the detector 104, and commands the sensors 110 deactivate. Alternatively, the controller 102 ceases to receive and/or process data from the sensors 110, but the sensors 110 may continue to collect data.

At step 516, the controller 102 determines if humans or other autonomous vehicles are traversing the sensing field 206. If the sensing field 206 is being traversed, indicating a fault due to a human or other autonomous vehicle attempting to enter the safe zone 208 and/or the trailer 210 while the autonomous vehicle 108 is operating within the trailer 210, the controller 102 commands the autonomous vehicle 108 to cease operation and movement at step 518. In an embodiment, the controller 102 can alternatively, or additionally, command the warning system 112 to issue an alert at step 518, as described herein.

In an embodiment, if another autonomous vehicle is traversing the sensing field 206, the controller 102 can command the other autonomous vehicle to navigate away from the loading dock, and can also command the autonomous vehicle 108 to navigate away from the safe zone 208 in order to avoid a potential collision with the other autonomous vehicle.

In another embodiment, the controller 102 can command both the other autonomous vehicle and the autonomous vehicle 108 to cease operation and movement so that human personnel can come assess the scene.

In yet another embodiment, if a human is traversing the sensing field 206, the controller 102 can command the autonomous vehicle 108 to navigate away from the safe zone 208 in order to avoid a potential collision with the human, or command the autonomous vehicle 108 to cease operation and movement so that it does not come into contact with the human.

Once the operation(s) with the trailer 210 have been completed by the autonomous vehicle 108, the detector 104 can be disarmed by the controller 102.

In another embodiment, the detector 104 is manually disarmed by human personnel after the autonomous vehicle 108 has completed its designated operation(s).

As described herein, in the event of a fault, an audit log containing data related to the fault is stored in the database 106 by the controller 102. Such data can include the identifiers for all of the autonomous vehicles involved, the loading dock identifier, the trailer identifier, a timestamp of when the sensing field was traversed, etc., as well as manually entered data such as any damage, injury, or loss which may have occurred, and any manual remedial measures taken by human personnel. Furthermore, the audit log is historical fault data which can be accessed by the artificial intelligence engine 116 as described herein.

In another embodiment, the autonomous vehicle 108 includes a vehicle controller that performs all or some of the operations of the controller 102 described herein, such the autonomous vehicle 108 is controlled locally by the vehicle controller versus by a remote system. In this embodiment, the controller 102 and the vehicle controller may be responsible for distinct, independent functions, or alternatively, the two controllers can work in conjunction with one another where responsibilities for certain functions are shared and/or distributed between the two controllers.

For example, the vehicle controller may be responsible for verifying an armed and/or disarmed state of the detector 104, arming and/or disarming the detector 104 during transit of the autonomous vehicle 108, continuously verifying or monitoring the armed and/or disarmed state of the detector 104 while the autonomous vehicle 108 is within the safe zone 208 and/or the trailer 210, ensuring that the detector 104 remains in an armed state while the autonomous vehicle 108 is within the safe zone 208 and/or the trailer 210, and ceasing operation of the autonomous vehicle 108 in the event of a fault of the detector 104.

Furthermore, the controller 102 may be responsible for receiving a manual arming command when the trailer 200 initially arrives at the loading dock 200, disarming the detector 104 in the event of a fault of the detector 104, and verifying the status of other hardware, components, and/or systems related to the loading dock 200, such as, for example, dock levelers and locking mechanisms.

In yet another embodiment, the controller 102 is located within the autonomous vehicle 108, and acts as both a vehicle controller as well as a controller for the monitoring system 100.

While the principles of the disclosure have been illustrated in relation to the exemplary embodiments shown herein, the principles of the disclosure are not limited thereto and include any modification, variation, or permutation thereof.

The invention claimed is:

1. A system for monitoring a loading dock, comprising:
- an autonomous vehicle communicatively coupled to a controller;
- a detector communicatively coupled to the controller, the detector located proximate to the loading dock, and the detector having an armed state and a disarmed state;
- a sensing field generated by the detector in the armed state; and
- a database communicatively coupled to the controller,
- wherein the controller is configured to:
- determine if the autonomous vehicle is permitted to operate at the loading dock by querying the database upon sensing arrival of the autonomous vehicle at the loading dock,
- command the detector to switch to the disarmed state from the armed state if the autonomous vehicle is permitted to operate at the loading dock,
- command the autonomous vehicle to traverse the sensing field such that the autonomous vehicle enters the loading dock, and
- command the detector to switch to the armed state from the disarmed state upon determining that the autonomous vehicle has fully traversed the sensing field.

2. The system of claim 1, wherein the detector is a light curtain.

3. The system of claim 1, wherein the controller is further configured to command the autonomous vehicle to cease operation upon sensing a fault of the detector when the detector is in the armed state.

4. The system of claim 1, wherein the autonomous vehicle is an automated forklift.

5. The system of claim 1, wherein the controller is located within the autonomous vehicle.

6. The system of claim 1, wherein the controller is located remote from the autonomous vehicle.

7. The system of claim 1, further comprising a warning system communicatively coupled to the controller.

8. The system of claim 1, wherein the controller is further configured to transmit data to the database related to at least one of (1) when the controller commands the detector to switch from the armed state to the disarmed state, (2) when the controller senses a fault of the at least one detector, and (3) when the controller commands the autonomous vehicle to cease operation.

9. The system of claim 8, wherein the data further comprises at least one of (1) an autonomous vehicle identifier, (2) a loading dock identifier, and (3) a trailer identifier.

10. A system for monitoring a loading dock, comprising:
- an autonomous vehicle communicatively coupled to a controller;

a light curtain communicatively coupled to the controller, the light curtain located proximate to the loading dock, and the light curtain having an armed state and a disarmed state;

a sensing field generated by the light curtain in the armed state; and a database communicatively coupled to the controller, wherein the controller is configured to:

determine if the autonomous vehicle is permitted to operate at the loading dock by querying the database upon sensing arrival of the autonomous vehicle at the loading dock, command the light curtain to switch to the disarmed state from the armed state if the autonomous vehicle is permitted to operate at the loading dock, command the autonomous vehicle to traverse the sensing field such that the autonomous vehicle enters the loading dock, and command the light curtain to switch to the armed state from the disarmed state upon determining that the autonomous vehicle has fully traversed the sensing field.

11. The system of claim 10, wherein the light curtain comprises a transmitter and a receiver located opposite the transmitter.

12. The system of claim 10, wherein the controller is further configured to command the autonomous vehicle to cease operation upon sensing a fault of the light curtain when the light curtain is in the armed state.

13. The system of claim 10, wherein the autonomous vehicle is an automated forklift.

14. The system of claim 10, wherein the controller is located within the autonomous vehicle.

15. The system of claim 10, wherein the controller is located remote from the autonomous vehicle.

16. The system of claim 10, further comprising a warning system communicatively coupled to the controller.

* * * * *